United States Patent Office 3,790,618
Patented Feb. 5, 1974

3,790,618
Nω-4,4-DIMETHOXYBENZHYDRYL DERIVATIVES OF ASPARAGINE AND GLUTAMINE
Wolfgang Konig, Langenhain, Taunus, and Rolf Geiger, Frankfurt am Main, Germany, assignors to Farbwerke Hoechst Aktiengesellschaft, vormals Meister Lucius & Bruning, Frankfurt am Main, Germany
No Drawing. Original application Mar. 12, 1969, Ser. No. 806,734, now abandoned. Divided and this application Apr. 21, 1971, Ser. No. 136,262
Int. Cl. C07c 103/32
U.S. Cl. 260—471 A    7 Claims

ABSTRACT OF THE DISCLOSURE $N^\omega$-4,4'-dimethoxybenzyl-protected asparagine and glutamine compounds useful as intermediates in the synthesis of therapeutics by peptide condensation reactions.

---

This application is a division of application Ser. No. 806,734, filed Mar. 12, 1969 now abandoned.

The present invention relates to a process for the manufacture of peptides containing asparagine and glutamine.

In the synthesis of asparagine- and glutamine-containing peptides in which the amide function is not protected, numerous side reactions occur. In such peptides the amide function can be dehydrated by peptide-forming reagents to yield the nitrile group, cyclic imides obtained as intermediates may cause the formation of isoasparagine or isoglutamine derivatives and the amide function may be split by acid or basic hydrolysis (cf. E. Schröder and K. Lübke, The Peptides, vol. I., Academic Press, New York and London, 1965, pp. 110, 203–204 and 191). In the case of N-terminal glutamine peptides the formation of pyroglutamic acid has also to be taken into consideration of (cf. Liebigs Ann. Chem. 707, 232 (1967)).

To avoid these side reactions, protective groups for the amide functions have already been developed. For example, N-carbobenzoxy-L-glutamine can be reacted with xanythydrol in glacial acetic acid to form Na-carbobenzoxy-Nγ-xanthyl-L-glutamine. The xanthyl group can be again split off by means of hydrobromic acid in glacial acetic acid. However, the yield is small after splitting. Another disadvantage of the xanthyl compounds is their slight solubility (cf. Bull. Chem. Soc. Jap. 35, 1966 (1962)).

Surprisingly, it has now been found that 4,4'-dimethoxybenzhydrol reacts with asparagine or glutamine as well as with N-carbobenzoxy-asparagine or N-carbobenzoxyglutamine in glacial acetic acid in the presence of protonic catalysts to yield the corresponding 4,4'-dimethoxybenzhydryl-amides. The 4,4'-dimethoxybenzhydryl group can easily be split off again in an acid medium.

The present invention therefore concerns, in a process for the manufacture of peptides built up from amino acids by condensing in a series of standard peptide condensation reactions, members selected from the group consisting of naturally occurring α-amino-acids, β-amino acids, α-methyl-alanine, 3,4 - dihydroxyphenyl - α - methyl-alanine or β-chloro-alanine in their D- and L-form, peptides built up from said amino acids and derivatives thereof and wherein at least one component of said amino acids is asparagine or glutamine, the improvement which comprises protecting said asparagine and/or glutamine radical with the 4,4'-dimethoxy-benzyl group.

The amido-substituted asparagine and glutamine derivatives may be prepared either (1) by the reaction of N-carbobenzoxy derivatives of glutamine and asparagine with 4,4'-dimethoxybenzhydrol in glacial acetic acid with the addition of catalytic amounts of acid catalysts such as concentrated sulfuric acid, $BF_3$-diethyl etherate, $ZnCl_2$, $AlCl_3$ or an organic sulfonic acid such as toluenesulfonic acid, or (2) by the reaction of glutamine or asparagine with 4,4'-dimethoxybenzhydrol in glacial acetic acid with the addition of molar amounts of concentrated sulfuric acid or $BF_3$-diethyl-etherate.

The 4,4'-dimethoxybenzhydryl groups can also be introduced subsequently under the reaction conditions mentioned into the asparagine- and glutamine-containing peptides, in which case free sulfhydryl groups present are blocked and free amino, carboxy and hydroxy groups may be blocked. As blocking groups there may be mentioned the following groups that are stable under the reaction conditions:

(1) Free amino groups are blocked by carbobenzoxy, 4-nitrobenzyloxycarbonyl, phthalyl;
(2) free sulfhydryl groups are blocked by benzyl, 4,4'-dimethoxy-benzhydryl, acetyl, benzoyl and other acyl groups as well as carbamoyl groups;
(3) free carboxyl groups are blocked by methyl, ethyl, isopropyl, benzyl, 4-nitrobenzyl;
(4) and free hydroxy groups are blocked by benzyl.

The compounds may then be used according to the methods generally known in peptide chemistry for preparing asparagine- and glutamine-containing peptides.

For example, the N-carbobenzoxy compounds obtained according to method (1) may be used for preparing the activated esters, such as p-nitrophenyl ester, in known manner. The use of diazo-methane provides the corresponding methyl esters that can be converted into the methylester hydrochlorides by hydrogenation in glacial acetic acid/methanol and subsequent titration with methanolic hydrochloric acid. $N^\omega$-4,4'-dimethoxybenzhydryl-asparagine and -glutamine prepared according to method (2) can be used, for example, for preparing the N-phthalyl- and N-o-nitrosulfenyl compounds.

These compounds can be converted according to the method of mixed anhydrides or activated esters or according to the carbodiimide and ynamine method, into peptides from which higher peptides can be synthesized after liberation of a carboxyl group, for example by saponification of an ester, or of an amine group.

The new protective groups are stable against alkaline hydrolysis, ammonolysis or hydrazinolysis so that in their presence, for example, carboxylic acid esters can be converted into carboxylic acids, carboxylic acid amides or hydrazides and N-phthalyl groups can be split off. The new protective groups are also resistant to other nucleophilic reagents which serve for splitting off the N-o-nitrosulfenyl groups: the o-nitrosulfenyl radical can be split off selectively by means of methanolic hydrochloric acid under mild reaction conditions with or without the use of indole. The new protective groups are likewise stable against catalytic hydrogenation. Thus, the N-carbobenzoxy group can be split off selectively by hydrogenation.

Further elements of the peptides containing the asparagine and glutamine derivatives are all naturally occurring amino acids in their L- or D-form, for example alanine, arginine, aspartic acid, cystine, cysteine, glutamic acid, glycine, histidine, hydroxy-lysine, hydroxy-proline, isoleucine, leucine, lysine, methionine, ornithine, phenyl-alanine, proline, serine, threonine, tyrosine and valine.

It is also possible to use β-amino acids, for example β-alanine or other synthetic or semi-synthetic amino acids, for example α - methyl-alanine, α - methyl - 3,4 - dioxy-L-phenyl-alanine or β-chloraniline, in their L- or D-form.

Other functional groups of the amino acids, for example, OH, SH, $NH_2$, COOH, >NH (histidine)-groups, may or must be protected by the methods generally applied in the peptide chemistry (cf. E. Schröder and K. Lübke, The Peptides, New York and London 1965, vol. I, especially pages 3 to 75).

In addition to the protective groups already mentioned above the following groups may be used for this purpose:

(1) Amino groups are protected by tert-butoxycarbonyl, o-nitrophenyl-sulfenyl, p - methoxybenzyloxy-carbonyl, adamantyloxy-carbonyl;
(2) sulfhydryl groups are protected by trityl, benzhydryl, $\alpha,\alpha$-dimethyl-4-methoxybenzyl, $\alpha,\alpha$-4-trimethylbenzyl, 1-phenylcyclohexyl, p-methoxyphenylcyclohexyl-(1);
(3) carboxyl groups are protected by tert-butyl, 2,4,6-trimethylbenzyl, p-methoxybenzyl;
(4) hydroxyl groups are protected by tert-butyl.

According to the invention, the new protective groups can be split off by treatment with strong organic acids such as formic acid and halogenocarboxylic acids such as trifluoroacetic acid, difluorochloroacetic acid or trichloroacetic acid, which may simultaneously serve as solvents; furthermore with preferably anhydrous mineral acids such as HBr in glacial acetic acid, anhydrous hydrofluoric acid, or with organic sulfonic acids in formic acid solution. Splitting may be effected at room temperature or at elevated temperatures. Additives capable of intercepting the cation formed, such as anisol, phenols, indole or indole derivatives, accelerate cleavage.

Table 1 indicates the conditions and the time measured for splitting off the protective group in $N^\alpha$-4,4'-dimethoxybenzhydryl-L-glutamine.

TABLE 1

The amide protective group of $N^\omega$-4,4'-dimethoxy-benzhydryl-L-glutamine was split off under different conditions. (The time for the splitting was determined by paper chromatography.)

| Splitting medium: | | Splitting time |
|---|---|---|
| (1) Boiling trifluoroacetic acid | minutes | 15 |
| (2) Boiling trifluoroacetic acid/anisole | do | <5 |
| (3) Trifluoroacetic acid/anisole at room temperature | hours | 2-3 |
| (4) 50%-HBr/glacial acetic acid at room temperature | do | 1-2 |
| (5) 50%-HBr/glacial acetic acid/indole at room temperature | minutes | 5-10 |
| (6) Glacial acetic acid/$BF_3$-diethyl-etherate at room temperature | hours | 2 |
| (7) Formic acid/anisole at 80° C. | do | 1 |
| (8) Formic acid/toluenesulfonic acid (4:1) anisole at 80° C. | minutes | <5 |
| (9) Trichloroacetic acid/anisole at 100° C. | do | <5 |
| (10) Trichloroacetic acid/aniole at 70° C. | do | 10-15 |

The products of the invention which have the formula

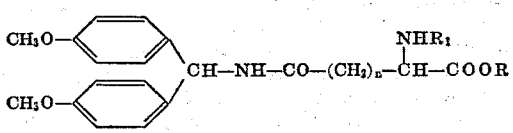

wherein $n$ is 1 or 2, R is hydrogen or methyl, $R_1$ is hydrogen or carbobenzoxy, and which are present in the form of their salts with strong acids if $R_1$ is hydrogen and R is methyl, may be used as intermediates, without splitting off the protective group, for the manufacture of other valuable glutamine- or asparagine-containing peptides, for example oxytocin, vasopressin, glucagon, secretin or insulin.

For example, it is possible to obtain the lysin-vasopressin by the reaction of the polypeptides obtainable according to the invention

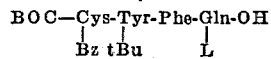

and

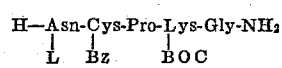

by the splitting off of the protective groups in known manner and subsequent oxidation of the SH-groups.

The following examples serve to illustrate the invention, but they are not intended to limit it thereto.

EXAMPLE 1

Preparation of L-Tyrosyl-L-Glutamine (a) $N^\alpha$-N,N'-dimethoxybenzhydryl-L-glutamine ($\alpha$) 1.45 g. (10 mmols) of glutamine and 2.4 g. of 4,4'-dimethoxy-benzhydrol (10 mmols) were introduced into 50 ml. of glacial acetic acid. At room temperature, 0.54 ml. of concentrated sulfuric acid was added thereto and the whole was stirred for about 2 hours. Subsequently 2 g. of anhydrous sodium acetate were added and the solution was concentrated. The residue was distributed between sodium acetate solution and acetic acid ester. After standing overnight in the refrigerator, a precipitate separated which was suction-filtered and washed with water. Yield 1.145 g. (=31% of the theory), M.P. 205–206° C. $[\alpha]_D^{22} = +7.5°$ (c.=2 in glacial acetic acid).

($\beta$) The compound may also be obtained in the following manner: 5.1 g. (10 mols) of N-carbobenzoxy-$N^\omega$-4,4'-dimethoxybenzhydryl-L-glutamine (prepared according to (b)) were dissolved in a mixture of glacial acetic acid and methanol (1:1). Palladium catalyst was added thereto and hydrogen was fed in until no more $CO_2$ escaped. The catalyst was suction-filtered and the filtrate was concentrated. The residue was triturated with ether and dried. Yield 3.65 g. (=98% of the theory). After recrystallization from water; the yield was 2.81 g. (75.5% of the theory), M.P. 205–206° C.

(b) N-carbobenzoxy-$N^\omega$-4,4'-dimethoxy-benzhydryl-L-glutamine ($\alpha$) 28 g. of carbobenzoxy-L-glutamine (0.1 mol) and 24 g. of 4,4'-dimethoxybenzhydrol (0.1 mol) were dissolved in 250 ml. of glacial acetic acid. At room temperature 0.5 ml. of concentrated sulfuric acid was added thereto, the whole was allowed to stand overnight and then poured into 750 ml. of water. An oil precipitated which crystallized soon afterwards. The crystal mass was suction-filtered and dissolved hot in acetic acid ester. The acetic acid ester solution was shaken with water, dried with sodium sulfate and concentrated. The residue was triturated with ether and suction-filtered. Yield: 45.8 g. (=90% of the theory), M.P. 117–120° C. $[\alpha]_D^{22} = -6.75°$ (c.=2 in dimethylformamide).

($\beta$) Another mode of preparation is the following: According to the usual method of carbobenzoxylation there was obtained from $N^\omega$-4,4'-dimethoxybenzhydroyl-L-glutamine, N-carbobenzoxy-$N^\omega$-4,4'-dimethoxybenzhydryl-L-glutamine in a yield of 80%, M.P. 117–120° C.

(c) N-carbobenzoxy-$N^\omega$-4,4'-dimethoxybenzhydryl-L-glutamine methyl ester 5.1 g. of N-carbobenzoxy-$N^\omega$-4,4'-dimethoxybenzhydryl-L-glutamine were dissolved in tetrahydrofurane. At room temperature an ether diazomethane solution was added dropwise thereto until a constant yellow color appeared. An excess of diazomethane was destroyed by means of some drops of glacial acetic acid. The solvent was removed in vacuo and the residue was triturated with petroleum ether. Yield 5.2 g. (=100% of the theory), M.P. 146–150° C. $[\alpha]_D^{22} = -10.8°$ (c.=2 in dimethylformamide).

(d) $N^\omega$-4,4'-dimethoxybenzhydryl-L-glutamine-methyl ester hydrochloride 23 g. of N-carbobenzoxy-$N^\omega$-4,4'-dimethoxybenzhydryl-L-glutamine methyl ester were dissolved in a mixture of glacial acetic acid and methanol (1:1) and the solution was hydrogenated in the presence of a palladium catalyst. After the evolution of $CO_2$ had ceased, the catalyst was separated by filtration and the solution was titrated against thymol-blue with methanolic hydrochloric acid. The mixture of solvents was distilled off in vacuo. The residue was dissolved in methanol and chromatographed on a neutral $Al_2O_3$-column. Yield 11.8 g. (=70% of the theory). The products could be recrystallized from methanol/ether, M.P. 182–183° C. $[\alpha]_D^{22}=+21.4°$ (c.=2, in methanol).

(e) N-carbobenzoxy-O-tert.-butyl-L-tyrosyl-N-4,4'-dimethoxybenzhydryl-L-glutamine-methyl ester 5.6 g. of N-carbobenzoxy-O-tert.-butyl-L-tyrosine-dicyclohexylamine salt were converted into the free acid by stirring at 0° C. with 2 N-citric acid and acetic acid ester. The acetic acid ester residue was dissolved in 40 ml. of methylene chloride. 4.2 g. of $N^\omega$-4,4'-dimethoxybenzhydryl-L-glutamine-methylester hydrochloride were added thereto, the whole was cooled to −10° C. and 1.4 ml. of triethylamine were added thereto. The mixture was stirred for 10 minutes and a solution of 2.2 g. of dicyclohexylcarbodiimide in a small amount of methylene chloride was added. Stirring was continued for several hours at 0° C., the mixture was placed in the refrigerator overnight and then the methylene chloride was distilled off. The residue was stirred with dimethylformamide, undissolved material was separated by suction-filtration and the filtrate was concentrated in vacuo. The residue was boiled with methanol, cooled and suction-filtered. Yield 5.9 g. (80% of the theory). Melting point 181–183° C. After recrystallization from methanol, M.P. 190–192° C. $[\alpha]_D^{22}=-12.1°$ (c.=2, in dimethylformamide).

(f) O-tert.-butyl-L-tyrosyl-$N^\omega$-4,4'-dimethoxybenzhydryl-L-glutamine 6 g. of N-carbobenzoxy-O-tert.-butyl-L-tyrosyl-$N^\omega$-4,4'-dimethoxybenzhydryl-L-glutamine-methylester were suspended in about 40 ml. of dioxane. 8.1 ml. of 1 N-NaOH were added thereto and the whole was stirred for about 2 hours at room temperature. The mixture was neutralized by means of some drops of 2 N-citric acid and then concentrated. The residue was distributed between acetic acid ester and 2 N-citric acid. The acetic acid ester phase was shaken once with water, dried with sodium sulfate and concentrated. The residue was dissolved in glacial acetic acid/methanol (1:1) and catalytically hydrogenated. When hydrogenation was terminated, the catalyst was separated by filtration, the filtrate was concentrated in vacuo and the residue was stirred with acetic acid ester and suction-filtered. Yield 4.6 g. (=95% of the theory). The product could be recrystallized from 70%-alcohol and crystallized as a hemihydrate, M.P. 174–177° C. $[\alpha]_D^{22}=+19.85°$ (c.=2, in glacial acetic acid). The substance was paper-chromatographically (Schleicher and Schüll No. 2043 b) uniform: $R_f=0.949$ in n-butanol/glacial acetic acid/pyridine/water (375:75:250:300); $R_f=0.876$ in n-butanol/glacial acetic acid/water (4:1:5).

(g) L-tyrosyl-L-glutamine 2 g. of O-tert.-butyl-L-tyrosyl-$N^\omega$-4,4'-dimethoxy-benzhydryl-L-glutamine, 2.5 ml. of anisole and 20 ml. of trifluoroacetic acid were refluxed for 5 minutes. Subsequently the trifluoroacetic acid was concentrated in vacuo and the residue was distributed between water and ether. The aqueous phase was stirred with Lewatit IR 45 (acetate-form) until a pH-value of 4 had adjusted itself. The exchanger was separated by filtration and the aqueous filtrate was concentrated. Yield 1 g. (95% of the theory). The substance was paper-chromatographically pure. $R_f=$ 0.471 in n-butanol/glacial acetic acid/pyridine/water (375/75/250/300); $R_f=0.091$ in n-butanol/glacial acetic acid/water (4:1:5).

EXAMPLE 2

N-Carbobenzoxy-L-Valyl-L-Glutaminyl-L-Phenylalanine-Methyl-Ester (a) N-carbobenzoxy-$N^\omega$-4,4'-dimethoxybenzhydryl-L-glutamine-p-nitrophenyl ester ($\alpha$) 5.1 g. (10 mmol) N-carbobenzoxy-$N^\omega$-4,4'-dimethoxybenzhydryl-L-glutamine and 1.7 g. of p-nitrophenol were dissolved in 20 ml. dimethylformamide. 2.2 g. of dicyclohexylcarbodiimide were added to the solution cooled to 0° C. and the whole was allowed to stand for 2 hours at 0° C. and for 1 hour at room temperature, the precipitate was suction-filtered and about 40 ml. of water were added to the filtrate. The crystals which had precipitated were suction-filtered and recrystallized from alcohol. Yield 3.85 g. (61% of the theory), M.P. 177–178° C. $[\alpha]_D^{22}=-10.8$ (c.=1, in dimethylformamide).

($\beta$) 2 g. (5 mmol) N-carbobenzoxy-L-glutamine-p-nitrophenylester were dissolved in 25 ml. of glacial acetic acid. 1.2 g. of 4,4'-dimethoxybenzhydrol and 1 drop of concentrated sulfuric acid were added thereto. The mixture was allowed to stand over-night at room temperature whereupon crystals precipitated. The crystals were diluted with about 30 ml. of water and the crystal mass was suction-filtered. The crystals were boiled up with alcohol and suction-filtered. Yield 2.8 g. (90% of the theory), M.P. 175–178° C.

(b) N-carbobenzoxy-$N^\omega$-4,4-dimethoxybenzhydryl-L-glutaminyl-L-phenylalanine-methyl ester ($\alpha$) 2.2 g. (5 mmol) of N-carbobenzoxy-L-glutaminyl-L-phenylalaninemethyl ester were dissolved in 25 ml. of glacial acetic acid. 1.2 g. of 4,4'-dimethoxybenzhydrol and 1 drop of concentrated sulfuric acid were added thereto. The mixture was allowed to stand overnight and then worked up as described in Example 2 according to (a)($\beta$). Yield 2.7 g. (81% of the theory), M.P. 200–204° C. $[\alpha]_D^{22}=-7.3$ (c.=1, in dimethylformamide).

Preparation of N-carbobenzoxy-L-glutaminyl-L-phenylalanine methyl esters used as starting material: 10.8 g. of L-phenylalanine methyl ester-hydrochloride were suspended in 100 ml. of tetrahydrofurane. The suspension was cooled to 0° C. and 6.8 ml. of triethylamine were added thereto. The whole was stirred for 10 minutes and subsequently a solution of 20.1 g. of N-carbobenzoxy-L-glutamine-4-nitrophenyl ester in 100 ml. of tetrahydrofurane/dimethylformamide (9:1) was added thereto. After standing for 3 days at room temperature the solution was concentrated and the residue was distributed between acetic acid ester and water. The acetic ester phase was washed with 2 N hydrochloric acid, a sodium bicarbonate solution and water and then concentrated. The residue was recrystallized from methanol/water (1:1). Yield 14.25 g. (65% of the theory), M.P. 181–182° C. $[\alpha]_D^{22}=-10.45°$ C. (c.=2 in dimethylformamide).

($\beta$) 2.4 L-phenylalaninemethylester - hydrochloride were placed in 20 ml. of dimethylformamide. While stirring 1.4 ml. of triethylamine were added dropwise thereto. Stirring was continued for 10 minutes at room temperature and then a solution of 6.3 g. (10 mmol) N-carbobenzoxy - $N^\omega$-4,4' - dimethoxybenzhydryl-L-glutamine-p-nitrophenylester in dimethylformamide were added thereto and the whole was allowed to stand for several days at room temperature. The precipitate was suction-filtered and filtrate was concentrated. The residue was boiled up with methanol, cooled and suction-filtered. Yield: 5.05 g. (76% of the theory) M.P. 201–204° C.

(c) N-carbobenzoxy-L-valyl-N$^\omega$-4,4'-dimethoxy-benzhydryl-L-glutaminyl-L-phenylalanine-methylester 2.16 g. (4 mmol) N-carbobenzoxy-L-valyl-L-glutaminyl-L-phenyl-alaninemethylester were dissolved in 20 ml. of glacial acetic ester. One drop of concentrated sulfuric acid was added thereto and the whole was allowed to stand overnight at room temperature. The substance was then worked up as described in Example 2 (a)($\beta$). Yield: 2.65 g. (86.4% of the theory), M.P. 242–245° C. $[\alpha]_D^{22} = -8.0°$ (c.=1, in dimethylformamide).

Preparation of N-carbobenzoxy-L-valyl-L-glutaminyl-L-phenylalanine-methylester used as starting material: 8.8 g. of N$^\omega$-carbobenzoxy-L-glutaminyl-1-phenylalanine-methylester were dissolved in 30 ml. of glacial acetic acid. 30 ml. of HBr/glacial acetic acid were added thereto and the whole was allowed to stand for 1 hour at room temperature. By adding ether an oil precipitated which was triturated with ether and dried at very reduced pressure. The amorphous mass formed was added to methylene chloride and 2.8 ml. of triethylamine and a solution of N-carbobenzoxy-L-valine-anhydride (prepared from 10 g. of carbobenzoxy-1-valine and dicyclohexylcarbodiimide in methylene chloride) were added at 0° C. The substance was allowed to stand overnight in the refrigerator and the precipitate which had separated was suction-filtered. The substance was washed with methylene chloride and the precipitate was recrystallized from methanol. Yield: 2.9 g., M.P. 235–236° C. $[\alpha]_D = -4°$ C. (c.=1 in dimethylformamide).

(d) N-carbobenzoxy-L-valyl-L-glutaminyl-L-phenylalanine-methylester 385 mg. (0.5 mmol) of N-carbobenzoxy-L-valyl-N$^\omega$-4,4'-dimethoxybenzhydryl-L-glutaminyl - L - phenylalanine-methylester were dissolved together with 0.3 ml. of anisole in 3 ml. of trifluoro-acetic acid. The solution was allowed to stand for 3 hours at room temperature and then concentrated in vacuo at room temperature. The residue was triturated with ether, suction-filtered and carefully washed with ether. Yield 265 mg. (98% of the theory), M.P. 238–239° C. $[\alpha]_D^{22} = -4.0°$ (c.=1 in dimethylformamide).

EXAMPLE 3

N-Carbobenzoxy-L-Asparaginyl-L-Tyrosine-Methylester (a) N - carbobenzoxy - N$^\omega$-4,4'-dimethoxybenzhydryl-L-asparaginyl-O-tert.-butyl-L-tyrosine-methylester 24.5 g. (50 mmol) of N-carbobenzoxy-N$^\omega$-4,4'-dimethoxybenzhydryl-L-asparagine were dissolved in 150 ml. of dimethylformamide, 14.5 g. of O-tert.-butyl-L-tyrosine-methylester-hydrochloride were added thereto, the mixture was cooled to $-10°$ C., 6.8 ml. of triethylamine were added while stirring, the whole was allowed to stand for 10 minutes at this temperature and finally a solution of 11 g. of dicyclohexylcarbodiimide was added to the reaction mixture. The mixture was stirred for some hours while cooling with ice and then placed overnight in the refrigerator. Subsequently the precipitate was suction-filtered and the filtrate was concentrated. The residue was boiled up with methanol, cooled and suction-filtered. Yield: 28.05 g. (77% of the theory), M.P. 208–209° C. $[\alpha]_D^{22} = +3.65$ ,c.=2, in dimethylformamide).

(b) N-carbobenzoxy-L-asparaginyl-L-tyrosine-methylester 1.45 g. (2.02 mmol) of N-carbobenzoxy-N$^\omega$-4,4'-dimethoxybenzhydryl-L-asparaginyl - O-tert.-butyl-L-tyrosine-methylester were dissolved together with 1 ml. of anisole in 10 ml. trifluoro-acetic acid. After standing for 3 hours at room temperature the solution was concentrated in vacuo at room temperature and the residue was carefully triturated with ether, suction-filtered and washed with ether. Yield: 846 mg. (94% of the theory), M.P. 197–199° C. $[\alpha]_D^{22} = +7.75°$ (c.=1 in dimethylformamide).

Preparation of N-carbobenzoxy-N$^\omega$-4,4'-dimethoxybenzhydryl-L-asparagine used as starting material: 27 g. of N-carbobenzoxy-L-asparagine (0.1 mol) were dissolved hot in 300 ml. of glacial acetic acid and reacted as described in Example 1 (b) ($\alpha$). Yield: 47.5 g. (96.5% of the theory), M.P. 176–180° C. $[\alpha]_D^{22} = +2.425$ (c.=2, in dimethylformamide).

EXAMPLE 4

N$^\omega$-4,4'-dimethoxybenzhydryl-L-asparagine-methylester-hydrochloride (a) N$^\omega$-4,4'-dimethoxybenzhydryl-L-asparagine: 1.3 g. of asparagine (10 mmols) and 2.4 g. of 4,4'-dimethoxybenzhydrol (10 mmols) were introduced into 50 ml. of glacial acetic acid. At room temperature 0.54 ml. of concentrated sulfuric acid was added thereto and the whole was stirred until complete dissolution (for about 2 hours). Subsequently 2 g. of anhydrous sodium acetate were added thereto and the solution was concentrated. The residue was distributed between sodium acetate solution and acetic acid ester. A gelatinous precipitate separated which was suction-filtered with water and acetic acid ester. The gelatinous residue was recrystallized from water. Yield 2.1 g. (58.6% of the theory). $[\alpha]_D^{22} = +9.75°$ (c.=2, in glacial acetic acid), M.P. 226–230° C.

(b) 49.2 g. of N-carbobenzoxy-N$^\omega$-4,4'-dimethoxybenzhydryl-L-asparagine were suspended in 400 ml. of glacial acetic acid and a palladium catalyst was added thereto. Hydrogen was passed into the suspension while stirring until complete dissolution had taken place and no more $CO_2$ formed. The catalyst was separated by suction-filtration and the filtrate was concentrated. The residue was triturated with a sodium acetate solution, suction-filtered, carefully washed with water and dried over $P_2O_5$. Yield: 33.6 g. (94% of the theory).

(c) N - carbobenzoxy-N$^\omega$-4,4'-dimethoxybenzhydryl-L-asparagine methylester: 4.05 g. of N-carbobenzoxy-N$^\omega$-4,4'-dimethoxybenzhydryl-L-asparagine were esterified with diazomethane in the manner disclosed in Example 1(c). Yield after recrystallization from acetic acid ester petroleum ether 3.4 g. (82% of the theory), M.P. 188–190° C. $[\alpha]_D^{22} = -4.35°$ (c.=2 in dimethylformamide).

(d) N$^\omega$-4,4'-dimethoxybenzhydryl-L-asparagine-methylesterhydrochloride: 15.3 g. of N-carbobenzoxy-N$^\omega$-4,4'-dimethoxybenzhydryl-L-asparagine-methylester were hydrogenated in the manner disclosed in Example 1(d). Yield 10 g. (81%), M.P. 186–188° C. $[\alpha]_D^{22} = +23.1°$ (c.=2 in methanol).

EXAMPLE 5

O-nitrosulfenyl-N$^\omega$-4,4'-dimethoxybenzhydryl-L-asparagine-cyclohexylamine salt 33.6 g. of N$^\omega$ - 4,4'-dimethoxybenzhydryl-L-asparagine were dissolved in 46 ml. of 2 N sodium hydroxide solution and 116 ml. of dioxane. While maintaining a pH value of 8, 19.6 g. of o-nitrosulfenylchloride and 46 ml. of a 2 N sodium hydroxide solution were added portionwise thereto. Subsequently the mixture was diluted with 930 ml. of water, acidified to pH 3 by means of citric acid and the aqueous phase was twice shaken with acetic acid ester. The acetic acid ester was dried with sodium sulfate and cyclohexylamine was added thereto. A yellow crystal mass precipitated which was suction-filtered and washed with acetic acid ester. Yield: 47.5 g. (84.6% of the theory), M.P. 182–184° C.

EXAMPLE 6

N-carbobenzoxy-N$^\omega$-4,4'-dimethoxybenzhydryl-L-glutaminyl-L-leucine-methylester 5.1 g. of N - carbobenzoxy-N$^\omega$-4,4'-dimethoxybenzhydryl-L-glutamine were dissolved in 30 ml. of absolute tetrahydrofurane. 1.7 g. of L-leucine-methyl-ester-hydrochloride and, while stirring, 1.4 ml. of triethylamine were added thereto. Within one hour a solution of 1.2 g.

of methylethinyldiethylamine in 10 ml. of tetrahydrofurane was added dropwise while stirring at room temperature. A viscous mass was obtained which was diluted with tetrahydrofurane. After the total amount had been added dropwise, stirring was continued for 30 minutes, the solution was concentrated, the residue was distributed between water and a large amount of hot acetic acid ester, the acetic acid ester phase was shaken with 2 N citric acid, sodium bicarbonate solution and water, dried with sodium sulfate and concentrated. The residue was triturated with petroleum ether. Yield: 5.5 g. (87% of the theory), M.P. 169–171° C. After recrystallization from acetic acid ester/petroleum ether: Yield 4.4 g. (70% of the theory), M.P. 174–178° C. $[\alpha]_D^{22} = -10.0°$ (c.=1, in dimethylformamide).

We claim:

1. Compounds of the general formula

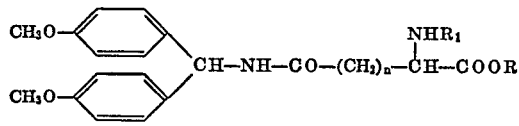

in which $n$ represents the integers 1 or 2, R represents a hydrogen atom or the methyl group and $R_1$ represents a hydrogen atom or the carbobenzoxy radical; if $R_1$ represents a hydrogen atom and R represents the methyl group, the compounds being present in the form of their salts with strong acids.

2. $N^\omega$-4,4'-dimethoxybenzhydryl-L-glutamine.

3. N - carbobenzoxy - $N^\omega$-4,4'-dimethoxybenzhydryl-L-glutamine.

4. $N^\omega$ - 4,4' - dimethoxybenzhydryl-L-glutamine-methyl ester hydrochloride.

5. $N^\omega$ - 4,4' - dimethoxybenzhydryl-L-asparagine-methylester hydrochloride.

6. N - carbobenzoxy - $N^\omega$-4,4'-dimethoxybenzhydryl-L-asparagine.

7. $N^\omega$ - 4,4'-dimethoxybenzhydryl-L-asparagine.

References Cited

Konig, W. et al.: chemical abstracts, vol. 73 (1970), p. 56425 S cited.

LORRAINE A. WEINBERGER, Primary Examiner

L. A. THAXTON, Assistant Examiner

U.S. Cl. X.R.
260—112.5, 519

UNITED STATES PATENT OFFICE
CERTIFICATE OF CORRECTION

Patent No. 3,790,618            Dated February 5, 1974

Inventor(s) Wolfgang Konig and Rolf Geiger

It is certified that error appears in the above-identified patent and that said Letters Patent are hereby corrected as shown below:

In the Heading:

After "Ser.No.136,262" insert

--Claim Priority, application Germany,

March 26, 1968, P 17 68 047.6--.

Signed and sealed this 21st day of May 1974.

(SEAL)
Attest:

EDWARD M. FLETCHER, JR.　　　　　　　　C. MARSHALL DANN
Attesting Officer　　　　　　　　　　　　Commissioner of Patents